United States Patent [19]

Fagerburg et al.

[11] Patent Number: 4,877,862
[45] Date of Patent: Oct. 31, 1989

[54] SOLID STATE POLYMERIZATION PROCESS FOR INCREASING THE MOLECULAR WEIGHT OF COLPOLY(ARYLENE SULFIDE)

[75] Inventors: David R. Fagerburg; Joseph J. Watkins, both of Kingsport, Tenn.

[73] Assignee: Eastman Kodak Company, Rochester, N.Y.

[21] Appl. No.: 337,712

[22] Filed: Apr. 13, 1989

Related U.S. Application Data

[63] Continuation-in-part of Ser. No. 196,710, May 20, 1988, abandoned.

[51] Int. Cl.⁴ .............................................. C08G 75/14
[52] U.S. Cl. .................................. 528/481; 528/389; 525/537
[58] Field of Search ................ 525/537; 528/388, 389, 528/481

[56] References Cited

U.S. PATENT DOCUMENTS

| | | |
|---|---|---|
| 2,513,188 | 6/1950 | Macallum . |
| 2,538,941 | 1/1951 | Macallum . |
| 3,354,129 | 11/1967 | Edmonds et al. . |
| 3,919,177 | 11/1975 | Campbell . |
| 4,038,259 | 7/1977 | Campbell et al. . |
| 4,038,260 | 7/1977 | Campbell . |
| 4,274,993 | 6/1981 | Narisawa et al. ................... 528/388 |
| 4,605,713 | 8/1986 | Heitz et al. ......................... 528/388 |
| 4,786,713 | 11/1988 | Rule et al. .......................... 528/389 |

Primary Examiner—Lewis T. Jacobs
Assistant Examiner—David W. Woodward
Attorney, Agent, or Firm—Charles R. Martin; William P. Heath, Jr.

[57] ABSTRACT

A solid-state polymerization process for increasing the molecular weight of a polymer such that the n value is at least 200 comprising heating within a heating zone at a temperature of at least 200° C. a crystalline polymer corresponding to the structure:

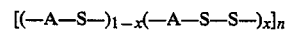

$$[(-A-S-)_{1-x}(-A-S-S-)_x]_n$$

wherein A is a divalent substituted or unsubstituted aromatic radical, x is in the range of 0.5 to 0.001 and n is at least 20 wherein the volume of the heating zone not occupied with polymer is either under vacuum or is occupied with an inert gas.

3 Claims, No Drawings

SOLID STATE POLYMERIZATION PROCESS FOR INCREASING THE MOLECULAR WEIGHT OF COLPOLY(ARYLENE SULFIDE)

This application is a Continuation-in-part of Ser. No. 196,710 filed May 20, 1988 now abandoned.

The invention relates to a solid-state polymerization process for increasing the molecular weight of a copoly(arylene sulfide) by heating the copoly(arylene sulfide) in the presence of an inert gas.

Poly(arylene sulfide) resins are thermosetting-thermoplastic polymeric materials with good thermal stability, unusual insolubility, resistance to chemical environments and inherent flame resistance. These resins additionally have good electrical insulative properties which make them ideal for electrical and electronic applications. Their excellent resistance to chemical degradation makes them ideal for use in chemical environments which involve organic solvents, and strong mineral acids, such as coatings for pipes, tanks, pumps and other equipment.

Poly(phenylene sulfide) is a commercial product which is generally produced by reacting p-dichlorobenzene with sodium sulfide in a polar organic solvent. This process if known as the Edmonds and Hill polymerization procedure and is disclosed in U.S. Pat. No. 3,354,129. Another approach to preparation of poly(phenylene sulfide) is the Macallum process wherein p-dichlorobenzene and sulfur are reacted in the presence of sodium carbonate. This procedure is disclosed in U.S. Pat. No. 2,513,188 and U.S. Pat. No. 2,583,941.

The poly(phenylene sulfide) which is formed in the Edmond and Hill process has only a modest molecular weight on the order of 10,000–40,000 and has relatively low melt viscosity. Higher molecular weights can be obtained by heating the PPS in the presence of oxygen. During heating, the molecular weight of the PPS increases due to a variety of chemical reactions including oxidation, crosslinking and chain extension. These curing reactions result in polymers which have inherent brittleness and reduced drawing capability while only achieving modest increases in molecular weight. Additionally, poly(phenylene sulfide) which is produced by polymerization in the presence of sulfide and/or hydrosulfide salts, such as sodium sulfide and sodium hydrosulfide, has a residual content of inorganic salt present in the polymer. These residual salts are, for example, sodium chloride and sodium sulfide resulting from the combination of the sodium cation with chlorine or sulfide from the starting materials. The presence of these residual salts in the polymer increases the corrosive nature of the polymer and can cause a deterioration in the drawing or spinning characteristics of the polymer. Residual salts can also result in breakages in the spun fibers and additionally contribute to plugging and clogging of the spinnert holes.

U.S. Pat. No. 3,354,129 discloses that in Column 6 the polymer prepared in accordance with the disclosure of U.S. Pat. No. 3,354,129 "can be heat treated in the absence of oxygen or with an oxidizing agent either under vacuum or at atmospheric pressure or superatmospheric pressure" in order to increase the molecular weight of the polymer. However, in Example 1 a run is reported that initially gives brittle polymer when molded at 310° C. When this sample was treated under vacuum for 3 hours at 340° to 360° C, it yielded a brittle part. The same material when worked in a molten state in the presence of air became tough. Further in Example 6 there is a specific comparison of heat treatment in air and nitrogen. The nitrogen-treated sample is brittle, whereas the airtreated one is tough. The nitrogen-treated material has increased in melt viscosity an insignificant amount in contrast to the air-treated sample.

U.S. Pat. No. 3,919,177, U.S. Pat. No. 4,038,259 and U.S. Pat. No. 4,038,260 for example all disclose that poly(phenylene sulfide) "... can be cured through crosslinking and/or chain extension, for example, by heating at temperatures up to about 480° C in the presence of a free oxygen-containing gas to provide cured products having high thermal stability and good chemical resistance." It is thus apparent that the curing in air to obtain a higher molecular weight, yet branched polymer is a normal teaching of the art. Increasing the molecular weight under inert conditions conversely is not taught.

Broadly, solid state polymerization is well known in the art for other polymers, such as polyesters. Specifically, the heating process of this invention is known to be useful for increasing the molecular weight of polyesters.

We have now discovered a solid-state polymerization process for increasing the molecular weight of certain copoly(arylene sulfides) wherein the polymer is heated either under vacuum or in the presence of an inert gas. Our invention can be broadly defined as a process comprising heating within a heating zone at a temperature in of at least 200° C a crystalline polymer corresponding to the structure:

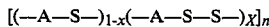

wherein A is a divalent substituted or unsubstituted aromatic radical, x is in the range of 0.5 to 0.001 and n is at least 20, preferably 30, wherein the volume of the heating zone not occupied with an inert gas.

The polymer useful in this invention is a copolymer wherein the vast majority of units in the copolymer are the (—A—S—) unit and the number of (—A—S—S—) or disulfied units are small compared to the number of (—A—S—) units. Generally, the number of (—A—S—S—) units is in the range of 0.5 to 0.001, based on the combined number of both (—A—S—) and (—A—S—S—) units. Thus, the copolymer prepared by the process of the invention can be represented as

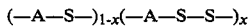

where x is in the range of 0.5 to 0.001. The sequence of (—A—S—) and (—A—S—S—) units is thought to be random throughout the molecular chain. When x is in the range of 0.5 to 0.2 the polymers obtained when A is p-phenylene are amorphorus and can be crystallized only with difficulty. When x is in the range of 0.2 to 0.1 the polymers obtained can be thermally crystallized and have crystalline melting points of 230° to 260° C. When x is in the range of 0.1 to 0.05 the polymers obtained have moderate crystallization rates and the crystallized polymers can be annealed to high crystalline melting points (280° to 290° C) and show Tch (temperature of crystallization on heating) and Tcc (temperature of crystallization on cooling) at increasingly lower and higher temperatures, respectively, indicative of increasing rates of crystallization. When x is in the range of 0.05 to 0.001 the crystallization rate increases rapidly with decreasing x.

The size of the polymer chain can conveniently be expressed as the total number of each kind of unit in the chain. Therefore, the copoly(arylene sulfide) which is used in the process of this invention corresponds to the structure

[(—A—S—)$_{1-x}$(—A—S—S—)$_x$]$_n$ wherein n is at least 20, preferably at least 30. As a result of the process of this invention the molecular weight increases and therefore the value of n increases. The value of n after the process of this invention has been used to increase the molecular weight is at least 200 and is preferably in the range of 500 to 5,000 as determined by melt viscosity measurement at 300° C. The degree of polymerization when A is p-phenylene can be calculated using the relationship log(n)=1.473+0.2873×log(melt viscosity) where melt viscosity is measured in poise.

These copolymers can be prepared by a process wherein a diiodoarylene compound corresponding to the structure

I—A—I where A is a divalent arylene readical is reacted with elemental sulfur to produce a substantially linear copoly(arylene sulfide) having both (—A—S—) units and (—A—S—S—) units.

Diiodoaromatic compounds which can be utilized in the present process include unsubstituted or substituted aromatics which have two iodine substituents. Suitable diiodoaromatic compounds include hydrocarbon aromatics, nitrogen-containing aromatics, sulfur-containing aromatics and oxygen-containing aromatics. Typical hydrocarbon aromatics include benzene and biphenyl, and condensed ring aromatics such as naphthalene and anthracene. Typical sulfur-containing aromatics include, for example, thiophene and benzothiophene. Typical nitrogen containing aromatics include, for example, thiophene and benzothiophene. Typical nitrogen-containing aromatics include pyridine and quinoline. Suitable oxygen-containing aromatics are, for example, furan, dibenzofuran, etc. Substituted diiodoaromatic compounds suitable for use with the present invention include aromatic sulfones, diarylethers, diarylcarbonyls, diarylsulfides and the like.

The aromatic starting materials may be substituted by one or more alkyl groups, preferably alkyl groups having from 1-6 carbon atoms. Specially preferred alkyl groups are methyl, ethyl, propyl and butyl groups, There is no limitation on the spatial arrangement of the substituents, for example, the substituents may be on a carbon adjacent to an iodine bearing carbon or may be on a carbon atom further removed from the iodine bearing carbon.

Additional substituents on the aromatic compounds may include phenyl, halogen, hydroxy, nitro, amino, $C_{1-6}$ alkoxy, and carboxylate and carboxylic acid substituents, as well as aryl sulfones and aryl ketones.

Preferred diiodoaromatic compounds are the diiodobenzenes, diiodonaphthalenes, diiodobiphenyls, diiododiphenyl ethers and diiodotoluenes which may be unsubstituted or substituted with any of the substituents noted above.

Specific diiodoaromatic compounds suitable for the present invention include p-diiodobenzene, m-diiodobenzene, p,p'-diiodobiphenyl, m,p'-diiodobiphenyl, p,p'-diiododiphenyl sulfone, p,p'-diiododiphenyl ether, 2,6-diiodonaphthalene, p,p'-diiodobenzophenone, p-diiodobenzene, p,p'-diiodobiphenyl, and p,p'-diiododiphenyl ether are most preferred.

The diiodoaromatic starting materials of the present invention may be prepared by any suitable process. For example, the diiodoaromatic compounds may be prepared by standard liquid or gas phase iodination reactions. A preferred method of preparing the diiodoaromatic starting materials is that disclosed in Ser. No. 912,806, filed September 9, 1986, now U.S. Pat. No. 4,746,758. Alternatively, the diiodoaromatic compounds may be produced by a transiodination process such as that disclosed in Ser. No. 029,899, filed March 25, 1987, now U.S. Pat. No. 4,792,641.

Sulfur is reacted as elemental sulfur and may consist of any of the standard forms which are possible for elemental sulfur. That is, the sulfur may be present in any of its allotropic modifications such as orthorhombic cyclooctasulfur (S8) or any other cyclic elemental sulfur such as any of the cyclosulfur species having 6-12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98%-100%, although sulfur having a lower degree of purity may be used. This lack of sensitivity to the presence of impurities in the sulfur is advantageous to the present process when used as a commercial process since highly purified sulfur is not required and the associated expense is not incurred.

In the process of the present invention sulfur reacts with a diiodoaromatic compound, eliminating elemental iodine and forming the PAS as shown below.

nArI$_2$+nS → (—Ar—S—)$_n$+nI$_2$

The formation of polymer is not sensitive to the relative stoichiometry of the diiodoaromatic compound and sulfur. Accordingly, an excess of sulfur or an excess of diiodoaromatic compound may be used in the polymerization process. When excess sulfur is used, more disulfide linkages are observed in the polymer. Decreasing amounts of sulfur result in decreasing levels of disulfide linkage in the final polymer. When the diiodoaromatic compound is present in excess, polymerization to high polymer can still occur, if the excess diiodoaromatic compound is removed during final polymerization.

The polymerization reaction is preferably carried out in the absence of solvent by merely heating and reacting the sulfur and diiodoaromatic compound. Under these conditions, the diiodoaromatic compound itself acts as a solvent for the sulfur which is melted thereby forming a substantially homogeneous solution enabling a facile and complete reaction.

In another embodiment, the diiodoaromatic compound can be dissolved in an organic solvent which is inert to the reaction conditions, i.e., which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene with sulfure, one might use benzene, toluene or naphthalene as a solvent.

During the polymerization reaction between the diiodoaromatic compound and sulfur elemental iodine is produced and evolves from the reaction melt or solution, or solid. Removal of the elemental iodine provides a driving force for completion of the polymeriztion reaction. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes. The present reaction, therefore does not result in wasted reaction products since both the PAS and elemental iodine are useful commercial chemical products.

The polymerization reaction is generally conducted at a temperature above about 175° C. Although the reaction may be conducted at temperatures below 175° C, the polymerization reaction is much slower. There is no particular upper temperature limit on the polymerization reaction, which may be conducted at any temperature below the decomposition temperature of the diiodoaromatic compound. For most polymerization reactions, temperatures in the range of about 175° to 400° C will be suitable, although for particular diiodoaromatic compounds temperatures in excess of 400° C may be used. Particularly preferred temperature ranges are from about 180° to 350° C.

The reaction is generally conducted for a period of at least one-half hour and is continued for up to about 10 hours or longer, and reaction times approaching infinity are theoretically possible. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semicontinuous or continuous process. Agitation of the reaction mixture is optional, however agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodoaromatic compound and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

In accordance with the solid-state polymerization process of this invention the copoly(arylene sulfide) prepared by the process broadly described by the preceding paragraphs must be crystalline in order for the molecular weight to increase during the heating step. If the polymer is not crystalline as a result of the process for its preparation, it must be crystallized prior to the heating step. This can be accomplished in accordance with techniques well known in the art, such as contacting the polymer with a suitable solvent, such as toluene, or heating the polymer to a temperature of about 30° to 100° C above the polymer glass transition temperature for sufficient time to develop enough crystallinity to prevent fusing during the subsequent higher temperature steps which usually requires approximately 15 minutes or more heating time.

In accordance with the invention the polymer must be in relatively small units during the heating step in order for the molecular weight to build up. Typically the solid polymer is granulated in accordance with techniques well known in the art. Although the exact particle size is not critical, particles which have a 0.25 inch screen are suitable for use in the invention.

The time used for the heating step can be any time sufficient to increase the molecular weight and can vary widely depending on the temperature and desired molecular weight. The higher the temperature the shorter the time and vice versa. For example, good results can be obtained by heating the polymer for several hours at 300° C.

The temperature used for the heating step can be any temperature sufficient to increase the molecular weight and is at least 200° C and preferably is in the range of 200° C to within 5° C of the melting point of the polymer.

In accordance with this invention the polymer is heated in the presence of either an inert gas or is heated under vacuum. The inert gas can be any gas which does not chemically react with the polymer, such as nitrogen or argon.

The heating step can be accomplished using equipment well known in the art for conducting solid-state polymerization, such as a double cone rotary dryer or fluidized bed reactor or moving bed reactor.

Other features of the invention will become apparent in the course of the following descriptions of exemplary embodiments which are given for illustration of the invention and are not intended to be limiting thereof.

EXAMPLE 1

This example illustrates the preparation of the polymer useful in the process of this invention. In a 3-neck, 500-mL, round-bottom flask are combined the following: 38.00 g sulfur (1.24 mol), 410.0 g p-diiodobenzene (1.19 mol), and 0.2 g of 4-nitro-1-iodobenzene to act as polymerization catalyst. The flask is fitted with a column for iodine takeoff, a mechanical stirrer, and the other neck is stoppered. The column is attached via a distillation head and takeoff tube to a receiver flask which is cooled in dry ice. The flask is maintained under about 200 torr pressure and immersed in a 230° C metal bath. After melting, the melt is stirrer mechanically. After about 30 to 45 minutes reaction time, iodine begins to distill into the receiver flask. The bath is maintained at 230° C for 2 hours, 50 minutes after which time the temperature is raised to 240° C. After holding there for an additional 40 minutes, the pressure in the reaction flask is reduced to about 120 torr and held there for 0.5 hours. The pressure is reduced again to about 60 torr, held there for an additional 0.5 hour, reduced again to about 30 torr, held there for an additional 0.5 hour, and finally the pressure is reduced to 0.1 torr. Twenty minutes after the final pressure reduction, the batch temperature is raised to 250° C. The reaction is held an additional 1.75 hours after the time and removed from the bath. The polymer melt is cooled under nitrogen, broken out of the flask, and granulated in a Wiley mill fitted with a 0.25 inch screen. The n value of the polymer is less than 20. A film pressed at 300° C of this material is partly tough and partly brittle. DSC showed a Tg of 85° C.

EXAMPLE 2

This example illustrates the practice of the invention wherein the polymer prepared in Example 1 is solid-state polymerized. Eighty grams of granulated polymer for Example 1 were treated 5 times with 180 g portions of toluene to crystalline the polymer. After additional treatment in a Soxhlet extractor to remove iodine, the polymer was dried in a 150° C block in tubes under 0.2 torr pressure. The polymer was then put in a heat block at 175° C under 0.1 torr pressure and the temperature of the block raised to 200° C one hour later. Sample tubes were pulled at 3 hours, 6 hours, 12 hours, and 24 hours. Pressed films were all tough in all sections. Melt viscosity measured at 300° C illustrated the molecular weight increase.

| Heating Time, Hours | Melt Viscosity, Poise |
|---|---|
| 3 | 5566 |
| 6 | 7004 |
| 12 | 13151 |
| 24 | 18440 |

The n value of all polymers was at least 200.

EXAMPLE 3

This example illustrates preparation of the polymer useful in the process of this invention and also practice of the invention. A separate preparation of the polymer was carried out with the following changes: the catalyst was 0.2 g of 1,3-diiodo-5.-nitrobenzene and the heating schedule was altered to 2 hours, 5 minutes, at 230° C, 1 hour, 35 minutes, at 240° C, and the final polycondensation was carried out at 0.8 torr, 250° C for 1 hour, 55 minutes. Polymer yield was 93.8%. The n value of the polymer was less than 20. The polymer was very brittle. Coherent films of the material could not be pressed at the normal 300° C press temperature.

Forty grams of granulated polymer was contacted with toluene for a short time and divided into two parts. An additional three, 20 g batches were placed in solid-stating tubes. One each of the toluene-treated tube and the untreated granules were placed in a heat block under vacuum (0.1 torr) at 175° C and held there 25 minutes before raising the block temperature to 210° C. After 21 hours, the samples were removed and cooled under vacuum. Pressed films are very tough. The same procedure was repeated except that the toluene-treated sample was held under a slow nitrogen flow while its control was held under vacuum. Both samples after 21 hours heating gave tough pressed films. The last untreated sample was placed in the heat block and air drawn over the sample during the course of heating. It also produced a tough film but with very much darker color than the other films. The n value has greater than 200.

Melt viscosity was measured on the above samples at 300° C for the solid-stated materials with the following results:

| Heating Treatment | Melt Viscosity, Poise |
|---|---|
| Vacuum | 14740 |
| Nitrogen | 14940 |
| Air | 17820 |

The starting polymer was so low in melt viscosity and also active in evolving vapors that it was impractical to measure melt viscosity at 300° C. It was instead measured at 270° C as 2294 poise.

EXAMPLE 4

This example illustrates that higher final melt-phase preparation of the poly(phenyl sulfide) still results in a polymer that is solid-state active towards molecular weight buildup. The weights of Example 3 were duplicated along with the process conditions until the reaction was under 0.1 torr vacuum. It was held at that pressure at 250° C for 1 hour after which the temperature was raised to 275° C and held there an additional hour. The final polymer yield was 92.8%, the melt viscosity was 11450 poise at 300° C and the n value was less than 20. After an initial thermal crystallization step at 175° C, this material was solid-state polymerized at 210° C for 21 hours under vacuum. The resultant melt viscosity was 40180 poise at 300° C and the n value was greater than 400.

EXAMPLE 5

This example further illustrates that higher final melt-phase preparation of the poly(phenylene sulfide) still results in a polymer that is solid-state active towards molecular weight buildup. The weights of Example 3 were duplicated along with the process conditions until the reaction was under 0.2 torr vacuum. It was held at that pressure at 250° C for 1 hour after which the temperature was raised to 275° C and held there an additional hour followed by raising the temperature to 300° C for 45 minutes. The final polymer yield was 93.7%, the melt viscosity was 48830 poise at 300° C and the n value was less than 20. After an initial thermal crystallization step at 175° C, this material was solid-state polymerized at 210° C for 21 hours under vacuum. The resultant melt viscosity was 130900 poise at 300° C. The n value was greater than 400.

We claim:

1. A process comprising heating within a heating zone for a period of time and at a temperature which is at least 200 degrees C, said time and temperature sufficient to increase the molecular weight of the polymer such that the value of n is at least 200, a crystalline, solid polymer corresponding to the structure:

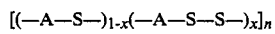

wherein A is a divalent substituted or unsubstituted aromatic radical, x is in the range of 0.5 to 0.001 and n is at least 20, wherein the volume of the heating zone not occupied with polymer is either under vacuum or is occupied with an inert gas.

2. The process of claim 1 wherein the temperature is within the range of 200° C to 5° C below the melting point of the polymer.

3. A process comprising heating within a heating zone for a period of time and at a temperature which is within the range of 200° C to 5° C below the melting point of the polymer, said time and temperature sufficient to increase the molecular weight of the polymer such that the value of n is at least 400, a crystalline, solid polymer corresponding to the structure:

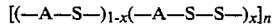

wherein A is a divalent unsubstituted phenylene radical, x is in the range of 0.5 to 0.001, and n is at least 30, wherein the volume of the heating zone not occupied with the polymer is under vacuum.

* * * * *